United States Patent [19]
Pollard

[11] 3,832,620
[45] Aug. 27, 1974

[54] REGULATING MODE SELECTOR SCHEME FOR AN ELECTRIC POWER CONVERTER

[75] Inventor: Ernest M. Pollard, Cherry Hill, N.J.

[73] Assignee: General Electric Company, Philadelphia, Pa.

[22] Filed: July 26, 1973

[21] Appl. No.: 382,742

[52] U.S. Cl. .......................... 321/5, 321/19, 321/40
[51] Int. Cl. ............................................. H02m 7/20
[58] Field of Search .................. 321/5, 19, 27 R, 40

[56] References Cited
UNITED STATES PATENTS

| | | | |
|---|---|---|---|
| 3,644,820 | 2/1972 | Ainsworth | 321/19 X |
| 3,746,966 | 7/1973 | Torok et al. | 321/40 X |
| 3,766,464 | 10/1973 | Reeve | 321/5 |
| 3,766,465 | 10/1973 | Reeve | 321/5 |
| 3,771,041 | 11/1973 | Chadwick | 321/5 |

Primary Examiner—William M. Shoop, Jr.
Attorney, Agent, or Firm—J. Wesley Haubner; Albert S. Richardson, Jr.

[57] ABSTRACT

In an electric power delivery system, means is provided for controlling the operation of a static power converter as a function of the magnitude and the polarity of a variable bipolar control signal. The control signal in turn is a function of a selected one of a plurality of variable bipolar input signals which respectively depend on the differences between actual and desired magnitudes of a plurality of different quantities dervied from the system. To select the proper input signal, first means is provided for deriving an output signal whose value depends on the most positive ranking signal in a first set of at least two of said input signals, second means is provided for deriving a resultant error signal which is representative of the most negative signal in a group consisting of the aforesaid most positive one signal and any signal in a second set of at least another of said input signals, and means is connected to the second means for producing the control signal which responds to variations of said resultant error signal.

14 Claims, 5 Drawing Figures

REGULATING MODE SELECTOR SCHEME FOR AN ELECTRIC POWER CONVERTER

This invention relates to control means for electric power converters, and more particularly it relates to an improved method and circuit for selecting the mode of regulation for a high-voltage static converter of the kind that can be operated alternatively as either a rectifier (converting a-c to d-c) or an inverter (converting d-c to a-c) in an HVDC electric power delivery system.

A static power converter suitable for HVDC power delivery systems comprises the combination of a polyphase power transformer and at least one group of six interconnected electric current conducting valves. Each of the valves can be a single mercury arc tube, or a plurality of semiconductor cells such as thyristors that are operated in unison. Typically the valves are arranged in 3-phase double-way 6-pulse bridge configurations having three separate a-c terminals and a pair of positive and negative d-c terminals. By sequentially firing the respective valves in the proper order and in synchronism with the sinusoidal alternating voltage of the 3-phase electric power network to which the a-c terminals of the bridge are connected, the flow of power between the a-c and d-c terminals can be controlled as desired.

The time at which a valve is fired, measured in electrical degrees from a recurrent reference point in each cycle of the associated voltage, is known as the "firing angle." It can be expressed either as an angle of delay ("alpha") after the positive-going zero crossing of the anode voltage of the valve, or as the complementary angle of advance ("beta") prior to the cyclically recurring instant at which the anode voltage waveform would have crossed zero and gone negative relative to the cathode if the valve had not been fired. Hereinafter the firing angle will be referenced to the latter instance, it being understood that a beta of $\beta$ degrees corresponds to a delay angle of $180° - \beta$. When beta is $180°$ (alpha = 0), the average magnitude of the rectified voltage between the d-c terminals of the converter has its maximum positive level, and the converter is able to deliver power from the a-c network to a load on its d-c side. As beta is decreased from $180°$ to approximately $90°$, the average d-c voltage decreases to zero. For betas in the range of $90°$ to zero, the average d-c voltage reverses polarity (i.e., the potential on the nominal positive terminal is relatively negative), and the bridge operates in its inverting mode whereby power can be transmitted from a source on the d-c side of the converter to the a-c network.

To fire an individual valve, its control grid or gate has to be activated by an appropriate trigger signal or gate pulse which is periodically applied thereto. A converter will therefore include suitable means for cyclically producing a series of gate pulses to fire the respective valves in the proper sequence and at the desired firing angle. Ordinarily the control means comprises a firing signal generator whose operation determines the timing of the gate pulses and hence the angle of the valve firings. The firing signal generator performs the function of a firing time computer. In accordance with modern practice in the art, it will include a voltage-control oscillator which normally runs at an harmonic (e.g., sixth or twelfth) of the fundamental frequency of the alternating voltage to drive a distributor which in turn generates a family of equidistantly spaced firing signals for respectively initiating the aforesaid gate pulses. An improved form of such firing means is disclosed in my co-pending U.S. patent application Ser. No. 382,015 filed on July 23, 1973, and assigned to the General Electric Co.

The frequency of the voltage-controlled oscillator, and consequently the firing angle of the family of firing signals, will vary as a function of a variable bipolar control signal. Generally during steady-state conditions the control signal is zero, and the oscillator runs in harmonic synchronism with the alternating voltage, in which event the frequency of the firing signals for each valve of the converter is the same as that of the system voltage and the angle ($\beta$) thereof is constant. A finite control signal of relatively positive or negative polarity will proportionately increase or decrease the oscillator frequency, whereby the firing signal frequency is correspondingly raised or lowered relative to the system frequency and $\beta$ is respectively advanced or retarded at a rate of change that depends on the magnitude of the control signal. By transiently varying the control signal in accordance with the difference between actual and desired magnitudes of a selected quantity of the system, the oscillator frequency will be momentarily changed as necessary to shift the firing angle to a value that results in equality between the response and the order, whereupon the control signal is reduced to zero and the frequency of the firing signals is again locked to the frequency of the alternating voltage.

In the above-summarized scheme for controlling the converter, the magnitude and the polarity of the control signal depend on an error signal derived by an associated regulator in which the actual magnitude of a given quantity is compared with a predetermined ordered magnitude which that quantity is required to equal. The given quantity can be current or power, voltage, frequency, "margin angle" (also called "extinction angle,") or the like. Heretofore the current in the d-c link of an HVDC power delivery system has commonly been selected for regulation at the converter located at the sending end of the link (rectifier terminal), while the margin angle has been selected for regulation at the converter located at the receiving end of the same link (inverter terminal). Other possibilities have been discussed in the literature. See for example chapter 5 (pages 62–84) on Compounding the Regulation in the texbook entitled "High Voltage Direct Current Power Transmission" by C. Adamson and N. G. Hingorani (Garraway Ltd., London 1960). In that chapter the authors explain the reasons for using minimum current regulation in combination with the constant margin angle regulation of an inverter.

In practice the regulating mode of a converter in an HVDC system is likely to change from time to time. For example, when the direction of power transmission is reversed, the two converters at opposite ends of the d-c link reverse their inverting and rectifying roles, and consequently it is necessary to interchange the quantities respectively regulated. Another example of an ordered change in regulating mode is during a starting process when the valve firing angle of one or both of the converters is temporarily regulated so as to conform to a programmed transition from starting to running conditions (see U.S. Pat. No. 3,648,147-Leete). In the Gotland D. C. Link*, frequency and current are al- ---
*The Gotland D. C. Link: the Grid Control and Regulation Equipment, by H. Forssell, Direct Current, December 1955, pages 166–70.

ternatively regulated, depending on which error is more positive.

A general objective of the present invention is to provide a regulator for a static power converter which regulator is equipped with improved means for correctly selecting the quantity to be regulated from at least three alternative choices.

Another object of my invention is to provide a regulating mode selector scheme that is capable of reliable and orderly switching from one mode of regulation to another in automatic response to changes in the operator commands or to disturbances in the quantities being regulated.

It is a further object to provide an improved regulator mode selector in which each mode is characterized by an independent transfer function which can be separately modeled as appropriate to the particular quantity that is regulated in that mode.

In carrying out my invention in one form, I provide a source of at least first, second, and third variable bipolar input signals which respectively depend on the errors between actual and desired magnitudes of a plurality of different quantities derived from an HVDC power delivery system. By way of example, these quantities can comprise, respectively, the minimum margin angle of the controllable electric valves that perform the power conversion function in the system, the current in the d-c link of the system, and the firing angle at which the valves are cyclically triggered. To select automatically the proper quantity for regulation, I provide a first value ranking means which is responsive to a first set of at least said first and second input signals for deriving an output signal whose value depends on the maximum or most positive one of the signals in said first set. A second value ranking means is responsive both to said output signal and to a second set of signals including at least said third input signal for deriving a resultant error signal which is representative of the minimum or more negative one of the group of signals consisting of a selected signal in the second set and the most positive one signal in the first set. The resultant error signal is fed to associated control means which responds to variations of the error signal by advancing or retarding the valve firing angle as necessary to reduce the error to zero. Preferably the second value ranking means includes a high-gain amplifier, and the amplifier output is connected to said source via three separate internal feedback circuits which respectively influence the values of said input signals as different functions of the value of said error signal.

My invention will be better understood and its various objects and advantages will be more fully appreciated from the following description taken in conjunction with the accompanying drawings in which.

Figure 1:
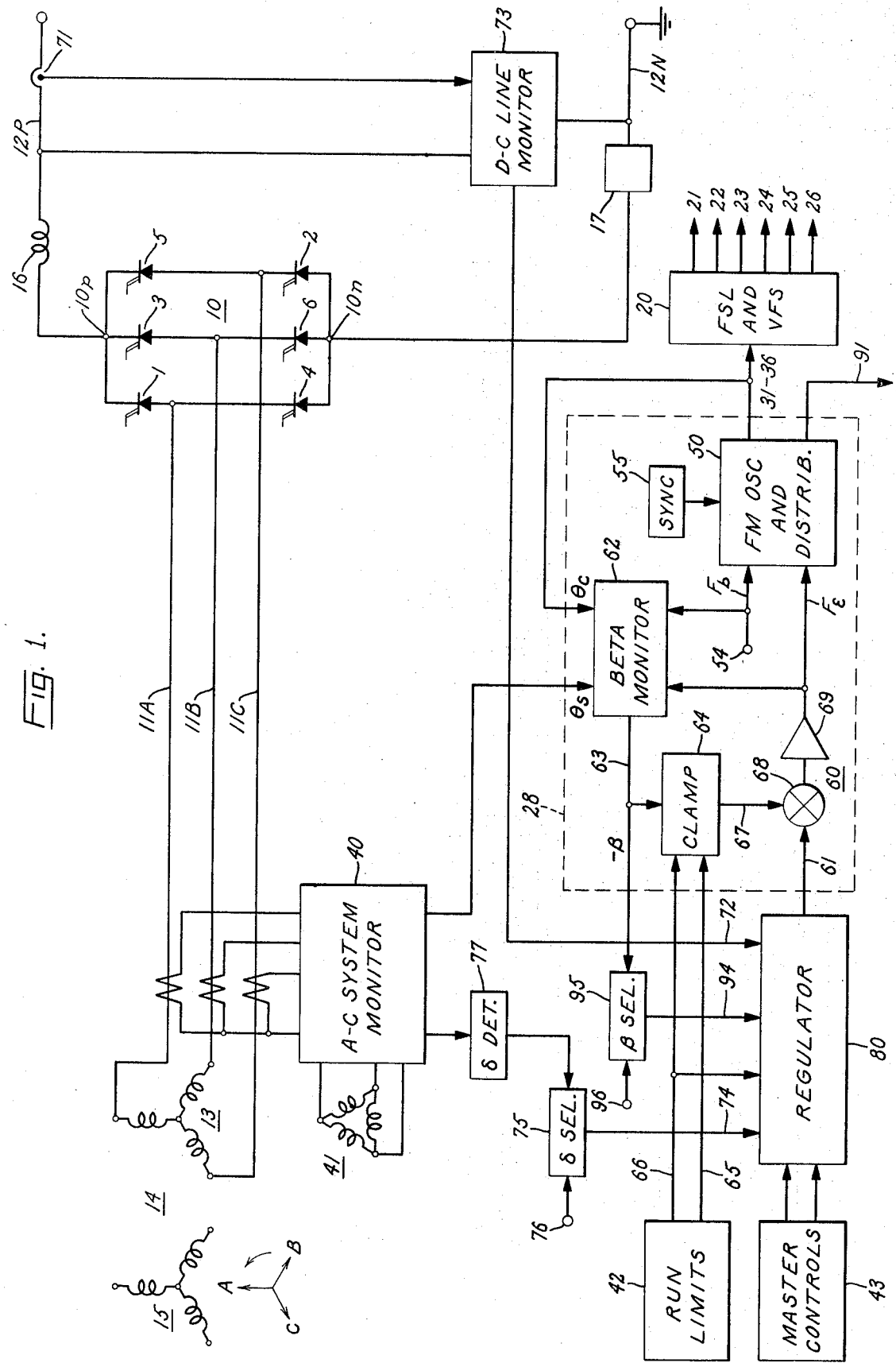
FIG. 1 is a functional block diagram of a static power converter the controls of which include a regulator that embodies my invention.

Referring now to FIG. 1, the illustrated converter is seen to comprise a group of six controllable electric valves 1, 2, 3, 4, 5, and 6 which are interconnected and arranged to form a 3-phase double-way 6-pulse bridge 10 whose a-c terminals are respectively connected to three separate a-c power conductors 11A, 11B, and 11C and whose d-c terminals 10p and 10n are respectively connected to a pair of d-c power conductors 12P and 12N. The a-c conductors 11A, 11B, and 11C are in turn connected to the star-connected secondary windings 13 of a main power transformer 14 whose 3-phase primary 15 is adapted to be connected to the respective phases of a polyphase a-C electric power network (not shown). The alternating voltages of the a-c network have a predetermined fundamental frequency (e.g., 60 Hz) and a phase rotation of A, B, C.

The nominal positive terminal 10p of the bridge 10 is connected to the first d-c conductor 12P by way of a conventional current smoothing reactor or choke 16, and the nominal negative terminal 10n is connected to the other d-c conductor 12N either directly or, more commonly, via the d-c terminals of at least one additional 6-pulse bridge connected in series with the bridge 10. In FIG. 1 the block 17 represents the companion bridges, and it will be understood that their a-c terminals are ordinarily connected to separate power transformers or to additional sets of 3-phase secondary windings inductively coupled to the primary 15 of the illustrated transformer 14. To form a 12-pulse converter, for example, a total of two bridges and two sets of secondary windings can be used, with the second set having its windings connected in delta so that its voltages are displaced in phase by 30 electrical degrees from the voltages on conductors 11A, 11B, and 11C, respectively.

The converter that is shown in FIG. 1 is intended to be part of one pole of a terminal or station of a power delivery system which can transmit high voltage direct current (HVDC) over the conductors 12P and 12N between the a-c network to which the transformer primary 15 is connected and another network to which the remote ends of these d-c conductors are coupled. Ordinarily there is another converter terminal (not shown) located between the remote end of the d-c link and the other a-c network. In this setting each of the six controlled valves in each bridge of the system must necessarily be capable of periodically blocking high voltages and conducting high currents. Toward that end, each valve preferably comprises a series string of parallel arrays of individual thyristors which are suitably arranged for switching and conducting effectively in unison. See for example U.S. Pat. No. 3,423,664-Dewey. Each of the constituent thyristors of a valve has its own gating means, and in order to turn on or to fire the valve suitable means is provided for simultaneously activating the gating means of all of its thyristors in response to a trigger signal being applied to the valve by associated controls.

The firing means for the valves of bridge 10 includes a valve firing system 20 which repetitively produces a series of appropriate trigger signals 21–26 and which sequentially applies these signals to the six valves 1–6 in numbered order. In FIG. 1 the valve firing system 20 is illustrated as a single block that is intended also to include a firing signal logic function. The valve firing system 20 is suitably designed to produce the trigger signals 21–26 in turn when activated by periodic output signals of a firing time computer 28. The firing time computer 28, during each cycle of the transformer secondary voltages, generates and distributes to the valve firing system a family of six staggered output pulses 31–36 (herein referred to as firing signals). The individual firing signals respectively commence at intervals of 60 electrical degrees, and it is their timing relative to the zero crossings of the alternating voltages on the conductors 11A, 11B, and 11C that determines the firing angle of the valves 1–6. By varying this firing angle, the direction and amount of power flowing between the a-c and the d-c conductors can be controlled in a known manner.

The firing time computer 28 is suitably constructed and arranged to vary, within prescribed limits, the timing of the family of firing signals relative to the zero crossings of the alternating voltages so that the actual direction and quantity of power will conform to a given power order. Toward this end, operation of the firing time computer 28 is affected by several interdependent inputs. As is shown in FIG. 1, one of the inputs is a periodic feedback signal $\theta_c$ which marks the initiation of successive valve firings in the bridge 10. Another input is a periodic reference signal $\theta_s$ which is synchronized with the fundamental sinusoidal voltage waveform of the power system. This reference signal is derived from the a-c network by means of an a-c system monitor 40 which is coupled to the power conductors 11A, 11B and 11C by suitable means such as tertiary windings 41 of the main 3-phase power transformer 14. Other inputs to the firing time computer are supplied by a block 42 labeled "run limits" and by a regulator 80 which in turn receives power orders from the master controls 43 and system responses from a variety of different feedback channels as will soon be more fully explained. It should be noted that in a 12-pulse converter the companion bridge 17 can either share the same firing time computer with the bridge 10 (as is further explained below) or have its own separate controls, in which case the firing time computers associated with the two bridges could be suitably arranged to operate either independently or in concert with one another.

As it is shown in FIG. 1, the firing time computer 28 comprises a signal generator 50 which is controlled by a variable bipolar control signal $F_\epsilon$, and means 60 for deriving the control signal from a bipolar input signal 61 whose source is the regulator 80. The signal generator 50 includes a voltage-controlled oscillator and a distributor. The voltage-controlled oscillator in turn comprises a frequency modulated clock whose operating frequency varies with the magnitude of a frequency determining voltage comprising the algebraic sum of the control signal $F_\epsilon$ and a bias signal $F_b$ of preselected magnitude. The latter signal, which is taken from a terminal 54, is appropriately dimensioned to cause the oscillator to run at a predetermined harmonic (e.g., twelfth) of the normal fundamental frequency (e.g., 60 Hz) of the alternating voltage of the a-c network so long as the control signal is zero. In steady state operation the oscillator produces a train of equidistant, discrete pulses whose frequency is a predetermined multiple of the a-c system frequency. The distributor responds to alternate pulses in this train by sequentially issuing at 60° intervals the periodic firing signals 31–36 which activate in turn the previously described valve firing system 20. In a 12-pulse converter the distributor can also generate a second family 91 of six firing signals, phase displaced by 30° with respect to the family 31–36, and the second family is fed to a valve firing system (not shown) for the companion bridge 17.

Each of the firing signals 31–36 produced by the signal generator 50 is a square-wave pulse of 180° duration. Concurrently with the commencement of each firing signal, the clock in the voltage-controlled oscillator is reset or cleared, and the oscillator immediately starts its next cycle of operation. 60° after initiating the sixth firing signal 36, the distributor repeats the first firing signal 31. In this manner the firing signal for each valve in the bridge 10 is cyclically generated at a frequency determined by the magnitude of the sum of $F_\epsilon + F_b$.

The timing of the start of each firing signal, relative to a cyclically recurring reference point which is the negative-going zero crossing of the corresponding valve voltage, is characterized by the electrical angle $\beta$. Under steady state conditions the control signal $F_\epsilon$ has a normal value (e.g., zero) that keeps the frequency of the firing signals in agreement with the fundamental frequency of the alternating voltage of the a-c network, and consequently the magnitude of $\beta$ is then constant. If the magnitude of $F_\epsilon$ were transiently changed in a positive or negative sense from normal, the firing signal frequency would be raised or lowered relative to the a-c system frequency, thereby advancing or retarding $\beta$ at a rate that depends on the amount of frequency difference.

For additional information about the signal generator 50 and its initial synchronizing means 55, see the disclosure of my above-referenced copending patent application. For reasons more fully explained therein, the control signal $F_\epsilon$ for the signal generator 50 is derived from the input signal 61 by means 60 which comprises a beta monitor 62 for producing an angle feedback signal 63 whose magnitude is representative of $\beta$, a clamp 64 for comparing the angle feedback signal 63 with preset minimum and maximum limits 65 and 66, respectively, and for supplying a limit signal 67 proportional in magnitude to the amount of any deviation of $\beta$ outside a range of permissible variations that these limits establish, and means 68 for algebraically summing the input signal 61 and the limit signal 67. The output of the summing means 68 is connected to a noninverting, unity gain amplifier 69 whose output is representative of the sum of the signals 61 and 67 and is the control signal $F_\epsilon$.

The beta monitor 62 is suitably constructed and arranged to produce an angle feedback signal whose magnitude varies with the predicted magnitude of $\beta$ for each consecutive firing signal that will in turn effect the next valve firing in numerical sequence. For this purpose the monitor that is the subject matter of my copending U.S. patent application Ser. No. 382,016 filed on July 23, 1973, and assigned to the General Electric Co. is well suited. Such a monitor utilizes the inputs indicated schematically in FIG. 1 and responds thereto with both high steady-state accuracy and fast transient response to produce an angle feedback signal 63 having relatively negative polarity and a magnitude that is a measure of the angular displacement between a system of rotating phasors that characterize the successive valve firings and a system of rotating phasors that characterize the successive phase-to-phase voltages of the polyphase a-c power system. The clamp 64 will influence the control signal $F_\epsilon$ as a function of any deviation of this angle feedback signal 63 beyond the respective minimum and maximum limits 65 and 66, and as a result the frequency of the signal generator 50 is varied as necessary to minimize the excursion of $\beta$ outside its permissible range. The preset maximum and minimum limits of $\beta$ are determined by the external run limits 42, and they may be varied or adjusted under certain system conditions.

So long as $\beta$ is within its range of permissible variations, the value of $F_\epsilon$ will vary with the value of the bipolar variable input signal 61, and hence the latter signal controls the firing angle $\beta$. This signal is supplied by the regulator 80 which, in accordance with the present invention, is constructed and arranged so as to vary the signal 61 in accordance with the difference between actual and desired magnitudes of a selected one of a plurality of alternative quantities of the system or of the converter. More details of a preferrred embodiment of the regulator 80 are shown in FIG. 2 which will be described next.

Figure 2:
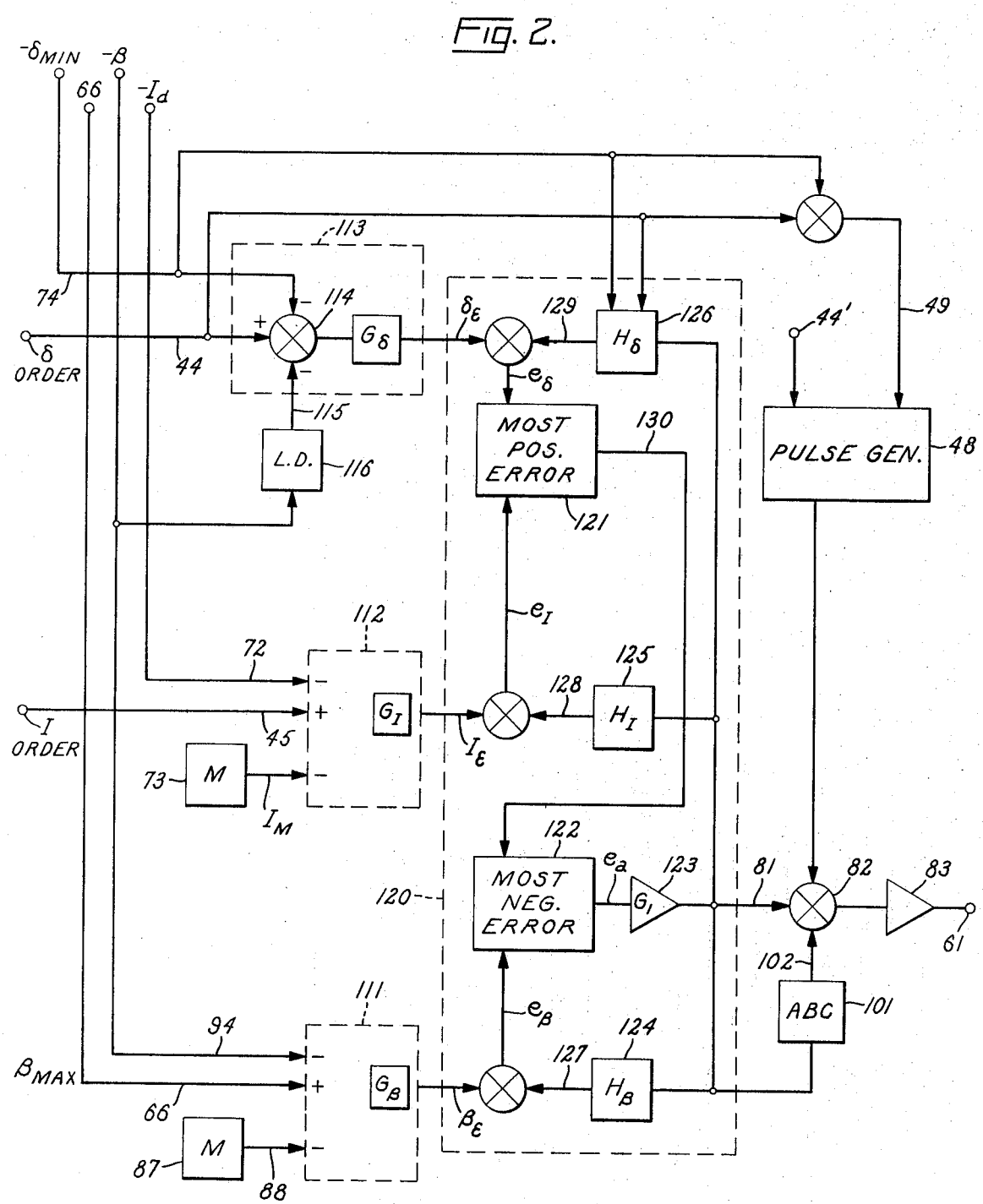
FIG. 2 is an expanded schematic diagram of the regulator shown as a single block in FIG. 1.

As it is illustrated in FIG. 2, the regulator 80 comprises a mode selector section and an amplifier section. The mode selector section comprises at least three separate summing means 111, 112, and 113 for respectively deriving three error signals ($\beta_\epsilon$, $I_\epsilon$, $\delta_\epsilon$), and selector means 120 for deriving a single resultant error signal 81 indicative of the value of a selected one of the individual error signals.

The summing means 113 in the mode selector section serves as a source of a minimum margin angle error signal $\delta_\epsilon$. It is seen to comprise a summing point 114 to which are coupled a response or feedback signal 74 which varies with the actual value of the minimum margin angle ($\delta_{MIN}$) of the converter and a margin angle order or reference signal 44 which determines the desired value of this quantity. The feedback signal 74 is taken from a minimum margin angle selector 75 which, as is indicated in FIG. 1, is connected to a margin angle detector 77 associated with the bridge 10 and, via a terminal 76, to a similar detector (not shown) associated with any companion bridge 17. The margin angle detectors produce signals representative of the actual margin angles of the respective valves of the two bridges immediately following each valve conducting period, and that signal representative of the smallest margin angle is selected for the feedback signal 74. Circuitry well suited for this purpose is disclosed and claimed in a copending patent application Ser. No. 229,359 filed for P. Chadwick on Feb. 25, 1972, and assigned to the General Electric Co. (now U.S. Pat. No. 3,771,041). The polarity of the feedback signal 74 is relatively negative, and thus the error signal $\delta_\epsilon$ reflects any difference between the actual and desired magnitudes of the minimum margin angle. An excessive minimum margin angle results in a negative error signal, a subnormal angle results in a positive error signal, and equality between the actual and the desired angles results in zero error. In FIG. 2 the net forward open loop gain of the summing means 113 is represented symbolically by the block $G_\delta$. For reasons to be explained hereinafter, under certain circumstances the summing means 113 is also influenced by a negative signal 115 that is produced by bias means 116 whenever the firing angle of the valves is more advanced than a predetermined angle.

The second summing means 112 in the mode selector section of the regulator 80 serves as a source of a current error signal $I_\epsilon$. It receives a response or feedback signal 72 which varies with the actual magnitude of current ($I_d$) in the d-c link of the power system and a current order 45 which determines the desired magnitude of this quantity. The current order 45 originates in the master controls 43. The feedback signal 72 is derived from the d-c link by means of a d-c line monitor 73 which, as is shown in FIG. 1, is coupled to the conductors 12P and 12N by suitable means including a d-c current transformer 71. The polarity of the feedback signal 72 is relatively negative, and thus the error signal $I_\epsilon$ will reflect the difference between the actual and desired magnitudes of current in the d-c conductors. It is common practice in the art to provide current regulating means at both ends of the d-c link and to set the desired constant magnitude of current at the inverter and a certain margin below the ordered value to which $I_d$ is regulated at the rectifier end. This is conveniently accomplished by adding a negative signal $I_M$ of appropriate magnitude to the summing means 112 of the regulator which is associated with the inverter controls, and for this purpose suitable bias means 73 is provided. The error signal $I_\epsilon$ will be zero when $I_d$ equals the established reference value of current, negative when $I_d$ is more than this value, and positive if $I_d$ is less than this value. As is indicated in FIG. 2, the net forward open loop gain of the summing means 112 is $G_I$.

The summing means 111 in the mode selector section of the regulator serves as a source of a firing angle error signal $\beta_\epsilon$. It is supplied with the response or feedback signal 94 which corresponds to the angle feedback signal 63 produced by the beta monitor 62 in the firing time computer 28 or, in a case where duplicate beta monitors are provided (as in some 12-pulse converters), which has a typical value determined by a beta selector 95 (see FIG. 1) from among the signal 63 and any other angle feedback signals 96 produced by the other monitors. In accordance with the teachings of my first-mentioned copending application, the same preset limit signal 66 that determines $\beta_{MAX}$ in the clamp 64 is also supplied to the summing means 111 where it establishes a reference value to which the actual value of beta will be regulated. The summing means 111 therefore derives an error signal $\beta_\epsilon$ which is a function of the deviation between the actual valve firing angle and the maximum limit thereof. To ensure a slight angular margin between the desired constant value to which beta is regulated and the maximum limit thereof, bias means 87 is provided for adding to the summing means 111 a small negative signal 88 that opposes the reference signal 66. When beta equals its desired value, the error signal $\beta_\epsilon$ is zero; an excessive beta will result in a relatively negative error signal, while a beta smaller than the desired value results in a positive error signal proportional to the deviation. The net forward open loop gain of the summing means 111 is $G_\beta$.

As can be seen in FIG. 2, all three of the summing means 111, 112, and 113 are connected to the selector means 120 of the regulator 80. Preferably the selector means is itself a closed loop regulating network comprising two value ranking means 121 and 122 each of which is arranged to compare the values of a particular set of input signals to determine which of them ranks most positive (or negative). The first value ranking means 121 is responsive to a first set of two variable bipolar input signals $e_\delta$ and $e_I$ which respectively depend on the minimum margin angle error $\delta_\epsilon$ and the current error $I_\epsilon$, and it provides an output signal 130 whose magnitude is determined by the more positive one of these input signals. Relative polarities have been chosen so that this more positive input signal is the one corresponding responding to the error signal that reflects the lowest actual value of the relevant quantity (either $\delta_{MIN}$ or $I_d$) compared to the desired value of that quantity. The second value ranking means 122 is responsive both to the output signal 130 of the means 121 and to another variable bipolar input signal $e_\beta$ which depends on the firing angle error $\delta_\epsilon$, and it derives a voltage $e_2$ which varies with the more negative one of a group of signals comprising $e_\beta$ and the more positive one of $e_\delta$ and $e_I$. The polarities are such that this more negative one signal corresponds to the error signal that reflects the highest actual value of the relevant quantity (either beta or whichever one of $\delta_{MIN}$ and $I_d$ has the comparatively lower value, as selected by the first value ranking means 121) compared to the desired value thereof. An amplifier 123 is associated with the second value ranking means 122, and the amplified signal 81 taken from its output is the aforesaid resultant error signal. The selector means 120 includes three separate internal feedback paths or circuits 124, 125, and 126 which are connected between the output of the amplifier 123 (which has a very high gain) and the source of the respective input signals, whereby the values of the aforesaid input signals are respectively influenced as different functions of the value of the resultant error signal 81.

More specifically, the feedback circuit 124 provides a feedback signal 127 which is related to the resultant error signal 81 by a first predetermined feedback transfer function $H_\beta$ and which is fed back to a summing point with the firing angle error signal $\beta_\epsilon$. In this manner the value of the error signal $\beta_\epsilon$ is modified by the addition thereto of the feedback signal 127, and their sum comprises the input signal $e_\delta$ for the value ranking means 122. The feedback circuit 125 provides a second feedback signal 128 which is related to the resultant error signal 81 by another feedback transfer function $H_I$, and the algebraic sum of this feedback signal and the current error signal $I_\epsilon$ comprises the input signal $e_I$ for the value ranking means 121. Similarly the feedback circuit 126 provides a feedback signal 129 which is related to the resultant error signal by yet another feedback transfer function $H_\delta$, and the algebraic sum of this feedback signal and the minimum margin angle error signal $\delta_\epsilon$ comprises the input signal $e_\delta$ for the value ranking means 121. Preferably the latter feedback channel 126 includes gain change circuit means responsive to the difference between the margin angle order 44 and the minimum margin angle feedback signal 74 for varying the transfer function $H_\delta$ in three discrete steps according to the magnitude and the polarity of the difference, as is described and claimed in the above-cited Chadwick patent application.

More details of the construction and the operation of a preferred embodiment of the selector means 120 of the mode selector section of the regulator 80 will be discussed soon hereinafter in conjunction with the description of FIGS. 3 and 4. To conclude the description of FIG. 2, it is noted that the resultant error signal 81 has a magnitude and a relative polarity respectively dependent on the amount and the sense of any deviation between actual and desired magnitudes of the selected system quantity from which is derived the more negative of either the input signal $e_\beta$ or the more positive one of the other input signals $e_I$ and $e_\delta$. This error signal 81 is coupled to a summing point 82 in the amplifier section of the regulator 80 where it is added to signals from certain other sources 48 and 101. The sum of these signals is then amplified by an amplifier 83 which serves as a low impedance output state whose gain is common to all of the regulating modes. The output of the amplifier 83 is the input signal 61 to the firing time computer 28. In a manner previously explained, the control signal $F_\epsilon$ in the firing time computer responds to input signal variations by transiently increasing or decreasing the frequency of the signal generator 50 so as to advance or to retard the firing angle to a correct value that minimizes the difference between the actual magnitude of the selected quantity and the desired magnitude thereof and thus reduces the resultant error signal 81 to zero.

As is taught in my first-mentioned copending application, the normal magnitude of the frequency determining voltage in the signal generator 50 is arranged to track the fundamental frequency of the alternating voltage of the a-c system, thereby changing the frequency of the signal generator as necessary to keep the firing signals 31–36 synchronized with system voltage in the event the frequency of the latter changes. As a result, the regulator 80 can operate with zero error, and the components of its mode selector section can have relatively low gains. Preferably this is done in the amplifier section of the regulator by the automatic bias circuit 101 that adds to the resultant error signal 81 a compensating signal 102 which is a relatively longtime integral of the error.

FIG. 2 shows that the summing point 82 of the amplifier section of the regulator is also coupled to a block 48 which represents a fast responding volt-second pulse generating means which is operative when the margin angle of the converter is being regulated to inject an appropriate signal for rapidly advancing the firing angle in response to a severe reduction in the minimum margin angle, such a reduction preferably being detected by comparing a second margin angle error signal 49 with a preset reference value 44'. Such pulse generating means is disclosed and claimed in the abovecited Chadwick patent application, and its function and advantages are fully explained therein.

Figure 3:
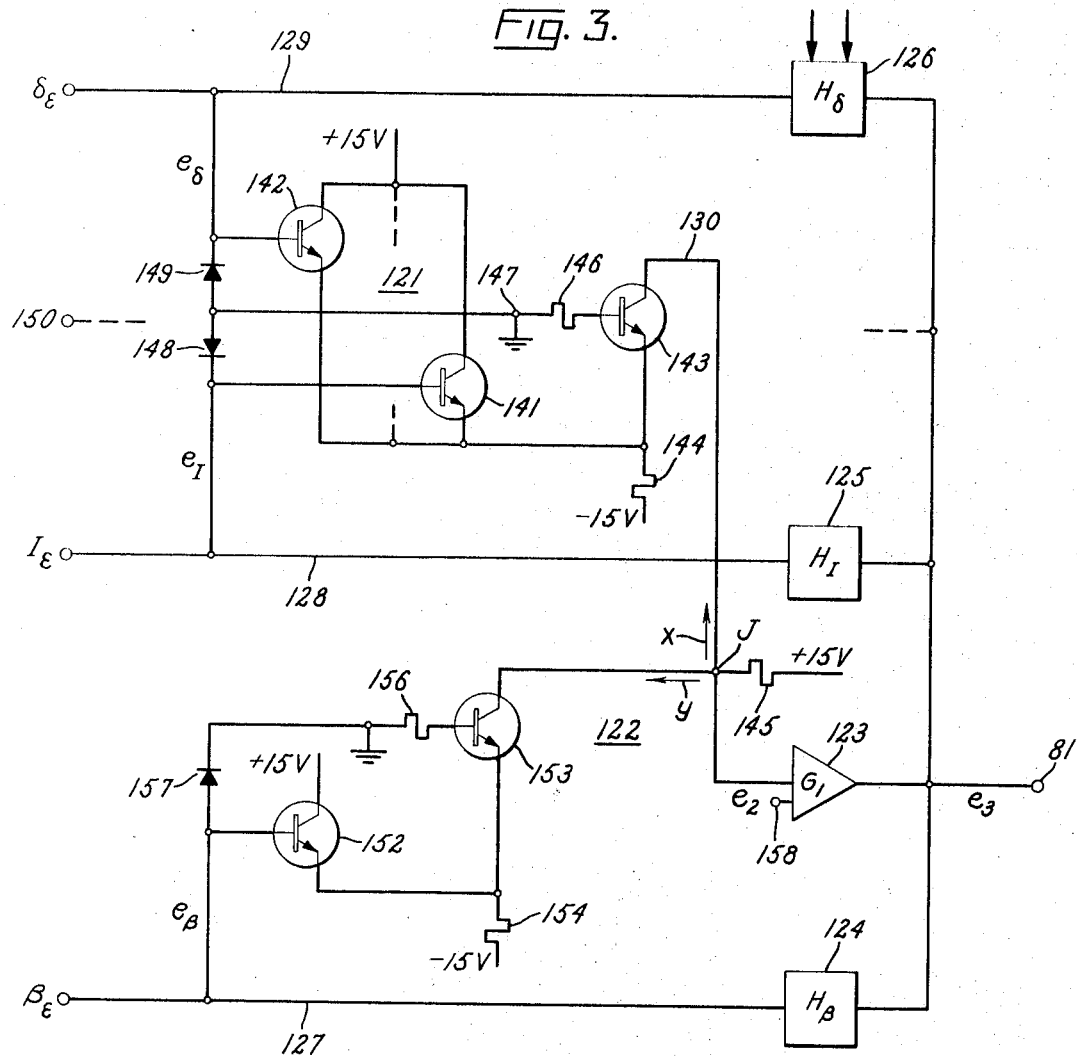
FIG. 3 is a schematic circuit diagram of a preferred embodiment of the selector means shown in block form in FIG. 2.

Turning now to FIG. 3, I will describe a practical embodiment of the selector means 120 of my regulator mode selector. In FIG. 3 the first value ranking means 121 comprises at least two NPN transistors 141 and 142 which are interconnected with another transistor 143 of the same kind to form an emitter coupled differential amplifier. The collectors of transistors 141 and 142 are both connected to a first d-c supply voltage bus of relatively positive potential (e. g., +15 volts), and their emitters, in common with the emitter of the companion transistor 143, are connected by way of a shared resistor 144 to a second d-c supply voltage bus of relatively negative potential (e.g., −15 volts). The collector of the transistor 143 is connected to a function J in the second value ranking means 122, and the latter means is seen to include an NPN transistor 153 whose collector is also connected to the junction J. A resistor 145 is connected between the junction J and the +15 V bus. The collector current of the transistor 143 comprises the output signal 130 of the first value ranking means 121.

In the value ranking means 121, a resistor 146 of relatively low ohmic value is connected between the base of the transistor 143 and a reference potential bus 147 (preferably grounded), whereby the base voltage of this transistor when conducting is maintained nearly equal to the reference potential (e.g., ground). The previously described input signal $e_I$ is applied to the base of the transistor 141, and between this base and the reference bus 147 there is connected a diode 148 which is poled to limit the maximum base potential, when negative with respect to ground, to a magnitude equal to the forward voltage drop of the diode. The second signal $e_\delta$ of the set of input signals for the value ranking means 121 is applied to the base of the transistor 142, and another diode 149 is disposed similarly to limit the maximum negative potential of this base.

As is suggested by phantom lines in FIG. 3, at least one additional transistor can be connected in a common-emitter configuration with the transistor 141 and 142 if desired, in which case its base electrode would be supplied with a variable bipolar input signal comprising the sum of a feedback signal derived from the output of amplifier 123 and an error signal 150 representative of the difference between actual and desired magnitude of another system quantity. At the inverter terminal, by way of example, the other system quantity might be the voltage $V_d$ across the d-c conductors 12P and 12N, or it might be the actual firing angle which is compared with a reference value of beta established by a preset minimum angle $\beta_{MIN}$.

The value of the output signal 130 of the value ranking means 121 will depend on whichever one of the signals in the set of input signals applied to the respective bases of the transistors 141, 142, etc., has the most positive value with respect to the reference potential (i.e., the maximum value with respect to the −15V bus). So long as the most positive signal differs from the others in the set by at least a predetermined magnitude, the less positive signals will have negligible influence on the output signal. In practice this predetermined magnitude difference is kept relatively low, e.g., 0.05 volt. Parameters are preferably selected so that with such an unbalance, whichever transistor 141 or 142 is biased by the more positive input signal conducts approximately nine times more current than the other. The collector current "$x$" of the transistor 143 (which current is the output signal 130) varies inversely with the sum of the emitter currents of the two transistors 141 and 142, thereby maintaining the total current in the common emitter resistor 144 relatively constant. When one of the transistors 141, 142 is biased by an input signal of zero magnitude (ground potential) and the other is cut off, the emitter current of the one transistor and the collector current $x$ are approximately balanced, and in this state the collector current $x$ equals a certain quiescent value K. If the more positive input signal is so large that it raises the base potential of the corresponding transistor 141 or 142 to a certain "saturation" level (e.g., +0.1 volt) with respect to ground, that transistor is turned fully on and feeds the total current to the resistor 144, whereby the transistor 142 is cut off and its collector current $x$ is then zero.

At the junction J in the second value ranking means 122 the collector current $x$ of the transistor 143 is summed with another current "$y$" comprising the collector current of the transistor 153. The current $y$ varies inversely with the input signal $e_\beta$ from which it is derived by means of an emitter coupled differential amplifier comprising an NPN transistor 152 in combination with the transistor 153. As is shown in FIG. 3, the collector of the transistor 152 is connected to the +15 V supply voltage bus, and its emitter, in common with the emitter of the transistor 152, is connected by way of a shared resistor 154 to the −15 V bus. A resistor 156 of relatively low ohmic value is connected between the base of the transistor 153 and the reference potential bus (ground), and a diode 157 is connected between the base of the transistor 152 and ground. The base potential of the latter transistor is determined by the input signal $e_\beta$ which is applied thereto, with its maximum positive value being limited to a magnitude equal to the forward voltage drop of the diode 157. When this input signal is zero (ground potential), the relatively constant total current in the common emitter resistor 154 is about equally divided between the transistors 152 and 153, and the resulting collector current $y$ of the transistor 153 has the quiescent value K. If the input signal increases with positive polarity to a certain "saturation" level (e.g., +0.1 volt) with respect to ground, the transistor 152 is turned fully on and consequently the transistor 153 is cut off, thereby reducing the collector current $y$ to zero.

While not shown in FIG. 3, the second value ranking means 122 can be modified if desired to respond to at least one additional variable bipolar input signal so that the magnitude of the net current $y$ depends on either the most positive or the most negative one of a set of input signals including $e_\beta$. For example, at the rectifier terminal of the HVDC power delivery system, an extra input signal could comprise an error signal representative of the difference between actual and desired magnitudes of the d-c voltage $V_d$, as modified by the addition of a feedback signal derived from the output of the amplifier 123, with the second value ranking means being appropriately arranged so that the more negative one of the two input signals controls the current $y$.

The second value ranking means 122 of the selector means derives an output voltage $e_2$ which is a function of the sum of the collector currents $x$ and $y$. As is shown in FIG. 3, this voltage is coupled to the inverting input of a high gain operational amplifier 123 whose other input is biased by a relatively positive reference voltage applied to a terminal 158. The amplified output voltage $e_3$ of the op amp 123 comprises the previously mentioned resultant error signal 81. So long as the sum of the collector currents x and $y$ equals the quiescent value K, the voltage $e_2$ matches the reference voltage, and the output voltage $e_3$ will have a steady state value of zero. But if this sum differs from K, the difference is amplified by 123 and the resulting output voltage $e_3$ is fed back to the input signal sources via the previously described internal feedback circuits 124, 125, and 126 so as to vary the respective input signals in a sense that will reduce the difference. If $x + y$ were to become higher than K, $e_3$ and hence the feedback signals (127, 128, 129) would increase in magnitude with positive polarity, thereby causing the respective input signals to change in a positive sense which tends to effect decreased conduction by the transistors 143 and/or 153. On the other hand, if $x + y$ were to fall below K, the feedback signals would increase in magnitude with negative polarity, thereby causing input signal changes in a negative sense which tends to effect increased conduction by these transistors.

The actual value of $x + y$ is governed principally by whichever one of the input signals in the group comprising $e_\beta$ plus the most positive one of $e_I$ and $e_\delta$ has the more negative ranking value with respect to ground (i.e., the minimum value with respect to the $-15V$ supply voltage bus). So long as the more negative signal in this group differs from the other by at least a predetermined magnitude, the less negative signal will have negligible influence on the output voltage $e_3$. In practice this predetermined magnitude difference is kept relatively low, e.g., 0.05 volt, and parameters are preferably selected so that with such an unbalance, the transistor 143 or 153 of whichever differential amplifier is driven by the most negative input signal conducts approximately nine times more current than the other.

The individual values of the various inputs signals presented to the value ranking means of my closed loop regulator mode selector are represented by the following equations:

$$e_\beta = \beta_\epsilon \quad G_\beta = H_\beta \quad e_3$$
$$e_I = I_\epsilon \quad G_I + H_I \, e_3$$
$$e_\delta = \delta_\epsilon \quad G_\delta + H_\delta \, e_3$$

The output voltage $e_3$ is equal to $-G_1 e_2$, where $G_1$ is the high gain of the op amp 123. The resulting composite operating characteristic of the converter has been illustrated in FIG. 4 which is a simplified graph of firing angle (beta) vs. d-c current ($I_d$). (Note that the d-c voltage $V_d$ is proportional to $-\cos\beta$ if the amplitude of the a-c voltage is assumed constant and the load dependent voltage drops of the converter are ignored.)

Figure 4:
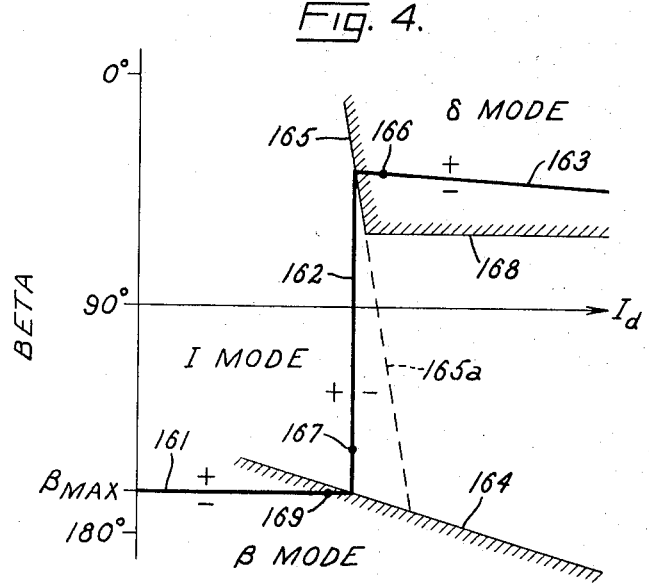
FIG. 4 is a graph of the firing angle vs. current characteristic of a converter utilizing the regulator shown in FIGS. 2 and 3.

In FIG. 4 the heavy solid-line segments 161, 162, and 163 are the loci of all possible steady state operating points corresponding to zero error ($e_3 = 0$). The first segment 161 is horizontal and marks a firing angle determined by the normal value of $\beta_{MAX}$ ($\beta_\epsilon = 0$). The second segment 162 is vertical and marks a constant current equal to the corresponding responding reference value ($I_\epsilon = 0$). The third segment 163 marks a constant margin angle equal to the ordered value ($\delta_\epsilon = 0$). If the actual magnitude of the relevant quantity where less than desired, the resulting error appears on the positive (+) side of these loci and causes the mode selector to produce a negative resultant error signal 81 which is amplified and inverterd by the amplifier section 83 of the regulator, and this in turn causes the firing time computer 28 to raise the frequency of the valve firing signals, thereby advancing (i.e., increasing) the firing angle $\beta$ and increasing the regulated quantity as necessary to minimize the error. On the other hand, if the actual magnitude of the quantity were more than desired, the resulting error has relatively negative (−) polarity and causes the mode selector to produce a positive resultant error signal 81 which, after amplification and inversion, causes the firing time computer 28 to lower the frequency of the firing signals, thereby retarding (i.e., decreasing) $\beta$ and reducing the quantity as necessary to minimize the error.

As can be seen in FIG. 4, a mode boundary line 164 separates the maximum firing angle control region ($\beta$ mode) from the current control region (I mode). This boundary exists where $e_2 = e_\beta = e_I$. Another mode boundary line 165 separates the current control region from the minimum margin angle control region ($\delta$ mode), and it exists where $e_2 = e_I = e_\delta$. Actually each of these mode boundaries is a band rather than a line, as will be explained below. They do not bisect the angles between adjoining segments of the zero error loci because the source/feedback circuits associated with the respective modes have different G/H values.

FIG. 4 depicts the converter operating characteristic at either terminal of the HVDC power delivery system. However, due to the injection of the negative signal $-I_M$ (see FIG. 2) in the source of current error $I_\epsilon$ of the regulator located at the inverter terminal, it should be understood that the constant current segment 162 of the zero error loci at the inverter terminal is displaced by approximately 0.1 per unit to the left of the same segment at the rectifier terminal. In the regulator 80 this displacement or margin has an equivalent magnitude at least as great as the aforesaid predetermined magnitude difference (0.05 volt), and preferably it is the same as the aforesaid saturation level (0.1 volt). This means that in the regulator mode selector at the inverter terminal, the input signal $e_\delta$ which is derived from the minimum margin angle error $\delta_\epsilon$ (zero steady state) is appreciably more positive than the input signal $e_I$ derived from the current error $I_\epsilon$ ($-I_M$ steady state), and consequently the former input signal alone controls the output voltage $e_3$. Thus the $\delta$ regulating mode is selected at the inverter, and normal operating point in this mode has been indicated at 166 in FIG. 4 by way of example. The location of this point along the constant margin angle segment 163 of the inverter characteristic normally is determined by the constant current segment of the operating characteristic of the rectifier at the opposite terminal of the HVDC system. At the same point the input signal $e_\beta$ which is derived from the beta max error $\beta_\epsilon$ at the inverter terminal is much more positive than $e_\delta$, and in fact it will have a positive potential above the saturation level of the transistor 152 so that the $\beta$ regulating mode is biased completely out of the picture.

In the normal operation of the rectifier terminal, the firing angle at which the ordered current is realized is greater than 90° but still less than $\beta_{MAX}$, and therefore the input signal $e_I$ (zero steady state) is appreciably more positive than $e_\delta$ and more negative than $e_\beta$. As a result, the I mode is selected and the other modes are rejected. In FIG. 4 a typical operating point at the rectifier terminal is indicated at 167 by way of example. At this point the bias means 116 (FIG. 2) is in effect. Whenever the firing angle advances beyond a predetermined angle (e.g., 55°), the bias means 116 injects an overriding negative signal 115 in the source of the minimum margin angle error $\delta_\epsilon$, thereby ensuring that the transistor 142 is biased off during rectifier operation. This allows highly negative current error signals resulting from excessive current in the d-c link to be transmitted to the regulator output without being clipped in the mode selector by a less negative margin angle error signal. Without this feature, the current control region would be confined to the left side of the line 165a shown in FIG. 4, and in fact this region would be even further restricted due to saturation of the margin angle detector 77. The influence of the overriding signal 115 on the boundary between $\delta$ and I modes is illustrated in FIG. 4 by the horizontal section 168 of this boundary.

It will now be appreciated that a regulator incorporating the features hereinbefore described will automatically select the proper quantity for regulation depending on the commands of the master controls and the conditions prevailing in the system. Any one of a plurality of source and feedback networks can be effectively switched into the regulating circuit. The switching is accomplished passively by the mode selector means in a manner depending upon the value ranking of the input signals. The respective modes have their own individual gain and frequency-dependent transfer functions G/H, and these can be separately tailored to optimize both transient and steady state responses for each of the quantities being alternatively regulated. For example, in practice the I mode will ordinarily be provided with a lower gain than the β mode but a higher gain then the δ mode, and its feedback circuit 125 will preferably include lead-lag compensation which is neither wanted nor used in the other modes.

To better understand the manner in which my regulator switches automatically from one mode to another, consider its operation at the rectifier terminal during an a-c voltage dip. Assume that there is a sharp decrease in the amplitude of the voltage of the a-c network at the rectifier terminal of the HVDC system, and that as a result the rectifier output voltage ($V_d$) is no longer sufficient to maintain the current ($I_d$) in the d-c link at its ordered magnitude even though the firing angle is fully advanced to $β_{MAX}$. In this event, after the regulator has increased beta to the value of $β_{MAX}$ in the effort to minimize the current error, the firing angle error approaches zero while a large and positive current error continues to exist. Consequently the input signal $e_β$ is now appreciably more negative than $e_I$, and the value ranking means 122 selects the former signal for regulation. In this case, the operating point of the rectifier will switch from the constant current segment 162 to the constant beta segment 161 of the zero loci. Meanwhile, at the inverter terminal, the reduction of d-c voltage and of $I_d$ causes the regulator to advance β, the input signal $e_δ$ consequently increases in the negative direction, and the current error derived input signal $e_I$ approaches zero and takes on a value more positive than $e_δ$. The value ranking means 121 of the inverter regulator will now select $e_I$ for regulation, and consequently this regulator switches from δ mode to I mode. With current being regulated at the inverter terminal, the rectifier terminal will have a new operating point 169 which, as is shown in FIG. 4, is located on the constant beta segment 161 and is displaced from the constant current segment 162 by an amount corresponding to the current margin $I_M$ (e.g., 0.1 per unit).

Figure 4A:
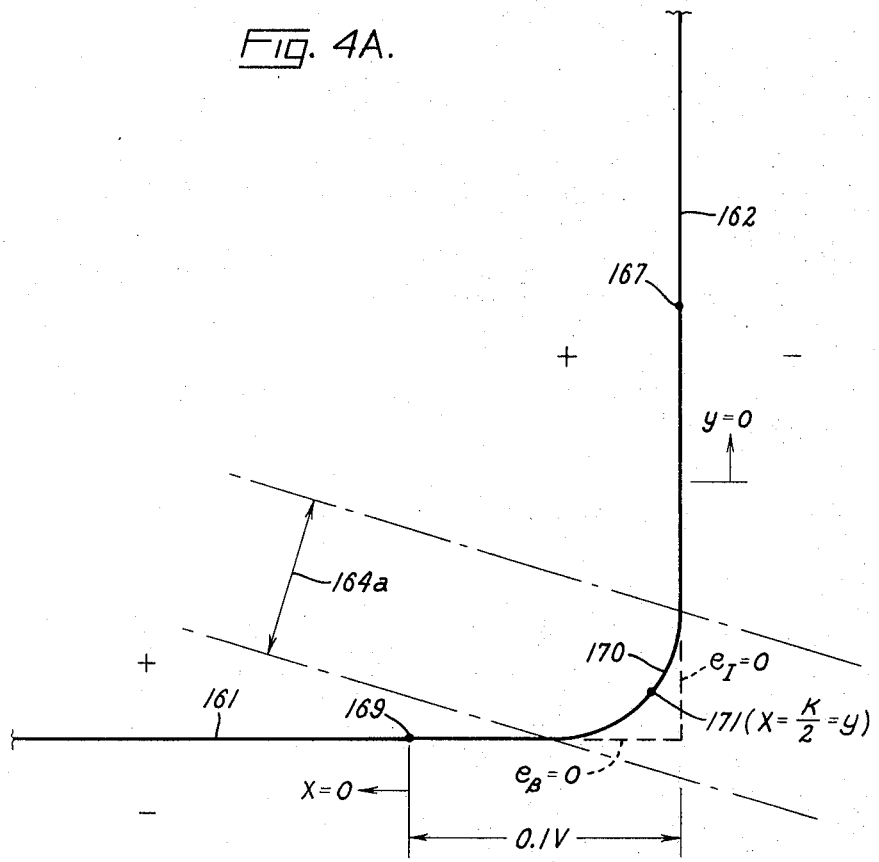
FIG. 4A is an enlarged view of part of the characteristic shown in FIG. 4.

As the dominant mode of regulation changes, there is a smooth transition from one mode to the other during which both are temporarily effective. This is illustrated in FIG. 4A which is an enlarged view of the intercept of zero error segments 161 and 162. FIG. 4A shows that the boundary between the I mode and the β mode is actually a band 164a which embraced all points at which the respective input signals $e_I$ and $e_β$ differ from each other by less than the aforesaid predetermined magnitude difference (e.g., 0.05 volt). At the normal constant current operating point 167 of the rectifier terminal, the input signal $e_β$ derived from the firing angle error has a large positive value exceeding the aforesaid saturation level of the transistor 152, whereby the transistor 153 is cut off and its collector current y in the value ranking means 122 is zero. As a result, the current error derived input signal $e_I$ alone controls the value of the output voltage $e_3$ of the regulator mode selector, and the gain of the rejected β mode is zero. On the other hand, at the alternative constant beta operating point 169, the input signal $e_I$ has a large positive value which is approximately equal to the saturation level of the transistor 141, whereby transistor 143 is cut off, its collector current x is zero, the input signal $e_β$ alone controls $e_3$, and the gain of the rejected I mode is zero. In between these extremes, there is a range of operating points at which either of the resistors 141 and 152 is turned fully on and both of the input signals $e_I$ and $e_β$ jointly influence the output voltage $e_3$. In this range, which occurs within the band 164a, the zero error loci is rounded as indicated at 170 in FIG. 4A. As has been explained hereinbefore, the output voltage $e_3$ varies with the sum of the collector currents x and y, and this sum is regulated by the mode selector to the constant value K. Midway through the band 164a, there is a steady state point 171 at which both of the input signals $e_I$ and $e_β$ are positive and equal, each having the magnitude that results in $x = k/2 = y$.

While I have shown and described the preferred form of my invention by way of illustration, obvious modifications will occur to those skilled in the art. For example, the invention could be practiced without the internal feed-back paths or circuits in the selector means 120 that is illustrated in FIG. 2, and/or the value ranking means 121 and 122 could comprise simple diode circuits instead of the transistorized versions shown in FIG. 3. I therefore contemplate by the claims which conclude this specification to cover all such modifications as fall within the true spirit and scope of my invention. What I claim as new and desire to secure by letters Patent of the United States is:

1. In an electric power delivery system comprising a plurality of controllable electric valves connected between a-c and d-c electric power conductors and means for cyclically firing said valves in a predetermined sequence and at firing angles that can be varied to control the flow of power between said a-c and d-c conductors, said firing means being operative to vary said firing angles as a function of the magnitude and the polarity of a variable bipolar control signal, improved means for supplying said control signal comprising:

a. a source of at least three variable bipolar input signals which respectively depend on the differences between actual and desired magnitudes of a plurality of different quantities of said system, the relative polarity of each of said input signals being positive if the actual magnitude of the relevant quantity is less than desired and being negative if the actual magnitude is more than desired;

b. first value ranking means responsive to a first set of two or more of said input signals for providing an output signal whose magnitude depends on that signal in said first set having the most positive value;

c. second value ranking means responsive to both said output signal and a second set of at least another one of said input signals for deriving a resultant error signal which is representative of the more negative one of a group of signals consisting of a selected signal in said second set and said most positive signal in said first set; and d. means connected to said second value ranking means for producing the control signal which responds to variations of said error signal by causing said firing means to advance or to retard the firing angle as necessary to minimize said error signal.

2. The improved control signal supplying means of claim 1 wherein said source includes bias means for increasing in a negative sense the magnitude of one of the input signals in said first set whenever the actual magnitude of a system quantity on which an input signal in said second set depends exceeds a predetermined magnitude.

3. The improved control signal supplying means of claim 1 wherein the system quantity on which an input signal in said second set depends is the valve firing angle, and said source includes bias means for increasing in a negative sense the magnitude of one of the input signals in said first set whenever the actual firing angle is more advanced than a predetermined angle.

4. The improved control signal supplying means of claim 1 wherein said second value ranking means includes a high-gain amplifier, said resultant error signal being taken from the output of said amplifier, and wherein there is connected between said amplifier output and said source at least three separate feedback circuit means for respectively influencing the values of said input signals as different functions of the value of said error signal.

5. The improved control signal supplying means of claim 1 wherein said source comprises at least first, second, and third means for respectively deriving said input signals from said different quantities of said system, wherein said second value ranking means includes a high-gain amplifier from whose output said resultant error signal is taken, and wherein feedback means are connected between said amplifier output and said source for influencing the value of the input signal derived by said first means as a first function of the value of said error signal, for influencing the value of the input signal derived by said second means as a second function of the value of said error signal, and for influencing the value of the input signal derived by said third means as a third function of the value of said error signal.

6. The improved control signal supplying means of claim 1 wherein said first value ranking means comprises a first differential amplifier whose output current varies inversely with said most positive signal in said first set, wherein said second value ranking means comprises (i) a second differential amplifier whose output current varies inversely with said selected signal in said second set and (ii) a high-gain amplifier supplied with the sum of said output currents, and resultant error signal being taken from the output of said amplifier, and wherein feedback means is connected between said amplifier output and said source for varying said input signals so as to maintain the sum of said output currents substantially constant.

7. The improved control signal supplying means of claim 1 wherein said selected signal in said second set is the most negative one signal in that set.

8. In an HVDC electric power delivery system comprising a plurality of controllable electric valves connected in a bridge configuration between a-c and d-c electric power conductors and means for cyclically firing said valves in a predetermined sequence and at firing angles that can be varied to control the flow of power between said a-c and d-c conductors, improved regulating means comprising:

a. a source of at least first, second, and third varaible bipolar input signals which respectively depend on the differences between actual and desired magnitudes of a plurality of different quantities of said system, the relative polarity of each of said input signals being positive if the actual magnitude of the relevant quantity is less than desired and being negative if the actual magnitude is more than desired;

b. bias means for increasing in a negative sense the magnitude of said first input signal whenever the actual valve firing angle is more advanced than a predetermined angle;

c. selector means connected to said source for deriving a resultant error signal which is representative of the more negative of either said third input signal or the more positive one of said first and second input signals; and d. means responsive to said error signal for controlling said firing means in a manner which varies said firing angle so as to reduce the value of said more negative signal toward zero.

9. The improved regulating means of claim 8 in which said first input signal depends on the minimum margin angle of the respective valves, said second input signal depends on the current in said d-c conductors, and said third input signal depends on the valve firing angle.

10. The improved regulating means of claim 8 wherein said selector means comprises first value ranking means supplied with at least said first and second input signals for providing an output signal whose magnitude is determined by whichever one of the input signals supplied thereto has the most positive value, and second value ranking means responsive to said output signal and to said third input signal for selecting the more negative of either said one signal which has the most positive value or said third signal and for deriving said resultant error signal from the selected signal.

11. In a method of regulating a converter in an HVDC electric power delivery system, said converter comprising a plurality of controllable electric valves connected in a bridge configuration between a-c and d-c electric power conductors and means for cyclically firing said valves in a predetermined sequence and at firing angles that can be varied, the steps of:

a. deriving from several different quantities of the system and of the converter a plurality of error signals which reflect the differences between actual and desired values of the respective quantities;

b. first selecting from among at least two different ones of said error signals the one signal that reflects the lowest actual value of the relevant quantity compared to the desired value thereof;

c. further selecting from a group of signals consisting of said first selected error signal and at least a third one of said error signals the one signal that reflects the highest actual value of the relevant quantity compared to the desired value thereof;

d. using said further selected error signal for controlling said firing means in a manner which varies said firing angle so as to reduce the value of said further selected signal toward zero; and e. rejecting all of the error signals other than said further selected one.

12. In a method of regulating a converter in an HVDC electric power delivery system, said converter comprising a plurality of controllable electric valves connected in a bridge configuration between a-c and d-c electric power conductors and means for cyclically firing said valves in a predetermined sequence and at firing angles that can be varied, the steps of:
   a. deriving a plurality of error signals whose values are respective representative of any differences between actual and desired values of various quantities of the system and of the converter;
   b. comparing the values of at least first and second ones of said error signals to determine which of them ranks most positive;
   c. comparing the values of at least a third one of said error signals and the most positive one of said first and second error signals to determine which one of these values ranks most negative; and
   d. deriving a resultant error signal indicative of that error signal whose value is the most negative ranking one for controlling said firing means in a manner that varies said firing angle so as to reduce said most negative value toward zero.

13. The method according to claim 12 including an additional step of modifying the respective values of said plurality of error signals as different functions of the value of said resultant error signal.

14. The method according to claim 12 including an additional step of modifying said first error signal by increasing its negative value whenever the actual magnitude of the quantity from which said third error signal is derived exceeds a predetermined magnitude.

* * * * *